US012223625B2

United States Patent
Tang et al.

(10) Patent No.: US 12,223,625 B2
(45) Date of Patent: Feb. 11, 2025

(54) MONTE CARLO RENDERING IMAGE DENOISING MODEL, METHOD AND DEVICE BASED ON GENERATIVE ADVERSARIAL NETWORK

(71) Applicant: HANGZHOU QUNHE INFORMATION TECHNOLOGY CO., LTD., Hangzhou (CN)

(72) Inventors: Rui Tang, Hangzhou (CN); Bing Xu, Hangzhou (CN); Junfei Zhang, Hangzhou (CN)

(73) Assignee: HANGZHOU QUNHE INFORMATION TECHNOLOGY CO., LTD., Hangzhou (CN)

( * ) Notice: Subject to any disclaimer, the term of this patent is extended or adjusted under 35 U.S.C. 154(b) by 472 days.

(21) Appl. No.: 17/631,397

(22) PCT Filed: Jun. 5, 2020

(86) PCT No.: PCT/CN2020/094759
§ 371 (c)(1),
(2) Date: Jan. 28, 2022

(87) PCT Pub. No.: WO2021/051893
PCT Pub. Date: Mar. 25, 2021

(65) Prior Publication Data
US 2022/0335574 A1    Oct. 20, 2022

(30) Foreign Application Priority Data
Sep. 17, 2019   (CN) .......................... 201910876687.8

(51) Int. Cl.
*G06T 5/70*   (2024.01)
*G06T 5/20*   (2006.01)
(Continued)

(52) U.S. Cl.
CPC .................. *G06T 5/70* (2024.01); *G06T 5/20* (2013.01); *G06V 10/7715* (2022.01);
(Continued)

(58) Field of Classification Search
CPC ... G06T 5/70; G06T 5/20; G06T 2207/20081; G06T 2207/20084; G06T 5/60;
(Continued)

(56) References Cited

U.S. PATENT DOCUMENTS 9,251,399 B2 *   2/2016   Hwang ...................... G06T 7/11
10,192,146 B2 *   1/2019   Sen .......................... G06N 7/01
(Continued)

FOREIGN PATENT DOCUMENTS

CN   109859147        6/2019
CN   109872288    *   6/2019
(Continued)

OTHER PUBLICATIONS

X. Yang et al., "Fast Reconstruction for Monte Carlo Rendering Using Deep Convolutional Networks," in IEEE Access, vol. 7, pp. 21177-21187, 2019, doi: 10.1109/ACCESS.2018.2886005. (Year: 2019).*

(Continued)

*Primary Examiner* — Andrae S Allison
(74) *Attorney, Agent, or Firm* — Jiwen Chen; Joywin IP Law PLLC

(57) ABSTRACT

The present invention discloses a denoising model of Monte Carlo rendering based on a Generative Adversarial Network (GAN) and its construction method, including: constructing a training sample and constructing a Generative Adversarial Network (GAN), including Denoising Net and Critic Net, wherein Denoising Net is used to denoise the input noise rendering image and auxiliary features, and output the denoising rendering image, and Critic Net is used to classify (Continued)

the input denoising rendering image and the target rendering image corresponding to the noise rendering image, and output the classification result. The training samples are used to tune the network parameters of the Generative Adversarial Network (GAN). After the tuning is completed, the denoising network determined by the network parameters is used as the Monte Carlo rendering image denoising model. A denoising method and device for the Monte Carlo rendering image are also disclosed, which can realize the denoising of noisy Monte Carlo renderings.

6 Claims, 3 Drawing Sheets

(51) Int. Cl.
*G06V 10/77* (2022.01)
*G06V 10/80* (2022.01)
*G06V 10/82* (2022.01)

(52) U.S. Cl.
CPC ............ *G06V 10/806* (2022.01); *G06V 10/82* (2022.01); *G06T 2207/20081* (2013.01); *G06T 2207/20084* (2013.01)

(58) Field of Classification Search
CPC .. G06V 10/7715; G06V 10/806; G06V 10/82; G06V 10/30; G06V 10/774; G06N 3/045
See application file for complete search history.

(56) References Cited

U.S. PATENT DOCUMENTS

| | | | |
|---|---|---|---|
| 11,557,022 B2* | 1/2023 | Munkberg | G06N 3/04 |
| 2018/0293496 A1* | 10/2018 | Vogels | G06V 10/454 |
| 2018/0293711 A1* | 10/2018 | Vogels | G06F 17/10 |
| 2018/0293712 A1* | 10/2018 | Vogels | G06F 18/2148 |
| 2018/0293713 A1* | 10/2018 | Vogels | G06V 10/82 |
| 2019/0122076 A1* | 4/2019 | Sen | G06N 7/01 |

FOREIGN PATENT DOCUMENTS

| | | |
|---|---|---|
| CN | 110148088 | 8/2019 |
| CN | 110223254 | 9/2019 |

OTHER PUBLICATIONS

Bing Xu, Junfei Zhang, Rui Wang, Kun Xu, Yong-Liang Yang, Huan Li, and Rui Tang. 2019. Adversarial Monte Carlo Denoising with Conditioned Auxiliary Feature Modulation. ACM Trans. Graph. 38, 6, Article 224 (Nov. 2019), 12 pages. https://doi.org/10.1145/3355089.3356547 (Year: 2019).*
Wong, KM., Wong, TT. Deep residual learning for denoising Monte Carlo renderings. Comp. Visual Media 5, 239-255 (2019) (Year: 2019).*
Chaitanya, Cra, et al., Supplemental Material: Interactive Reconstruction of Monte Carlo Image Sequences Using a Recurrent Denoising Autoencoder, ACM Transactions on Graphics, vol. 36, No. 4, Article 98 (Jul. 2017).
Bako, Steve et al., Kernel-Predicting Convolutional Networks for Denoising Monte Carlo Renderings, ACM Transactions on Graphics, vol. 36, No. 4, Article 97 (Jul. 2017).

* cited by examiner

MONTE CARLO RENDERING IMAGE DENOISING MODEL, METHOD AND DEVICE BASED ON GENERATIVE ADVERSARIAL NETWORK

This is a U.S. national stage application of PCT Application No. PCT/CN2020/094759 under 35 U.S.C. 371, filed Jun. 5, 2020 in Chinese, claiming priority to Chinese Patent Applications No. 201910876687.8 filed Sep. 17, 2019, all of which are hereby incorporated by reference.

TECHNICAL FIELD

The present invention belongs to the field of image denoising, and in particular relates to a Monte Carlo rendering graph denoising model, method and device based on a Generative Adversarial Network (GAN).

BACKGROUND TECHNOLOGY

Based on Monte Carlo Simulation (Monte Carlo Simulation) rendering technology, because the variance convergence of the rendered image requires a large amount of sampling, the rendering technology consumes significant amount of time and computing resources. In order to save computing resources and reduce rendering time, generally a lower sampling rate is used for rendering to obtain a noisy rendered image, and then certain denoising techniques are used to denoise the rendered image to obtain a noise-free and better visual performance rendering.

At present, the more advanced denoising technology for Monte Carlo rendering is mostly based on deep learning. The most commonly used is the use of Convolutional Neural Network (CNN) to denoise the Monte Carlo rendering. Specifically, the L1 norm/L2 norm loss function of the Monte Carlo rendering and the target noise-free image are used as the goal of optimizing regression. The Convolutional Neural Network (CNN) is trained, and the trained Convolutional Neural Network (CNN) model can implement the denoising of the Monte Carlo rendering.

Disnney's "Bako S, Vogels T, McWilliams B, et al. Kernel-predicting convolutional networks for denoising Monte Carlo renderings [J]. ACM Transactions on Graphics (TOG), 2017, 36(4): 97." and Nvidia's "Chaitanya C R A, Kaplanyan A S, Schied C, et al. Interactive reconstruction of Monte Carlo image sequences using a recurrent denoising autoencoder[J]. ACM Transactions on Graphics (TOG), 2017, 36(4): 98." As the optimization target of pixel level loss, it is difficult to accurately describe the real human visual experience. Therefore, even if the standard is high on this optimization target, it will often get relatively fuzzy or low-reduced high-frequency details, which will denoise the Monte Carlo rendering afterwards lacks realism in details, and even some areas with more high-frequency details appear dirty. For example, after denoising the indoor rendering, the corners and skirtings of the ceiling in the indoor rendering will be dirty.

Therefore, there is an urgent need for a denoising technology for Monte Carlo rendering, which can achieve a good denoising effect on low-frequency details and better preserve high-frequency details.

SUMMARY OF THE INVENTION

The object of the present invention is to provide a Monte Carlo rendering image denoising model based on a Generative Adversarial Network (GAN) and its establishment method. The established Monte Carlo rendering image denoising model can realize the denoising of the Monte Carlo rendering image containing noise. Noise, while achieving a good denoising effect on low-frequency details, it can also significantly improve the retention of high-frequency details to obtain a more visually realistic rendering.

Another object of the present invention is to provide a denoising method and device for a Te Carlo rendering image. The denoising method and device use the Monte Carlo rendering image denoising model constructed as described above, which can realize the denoising of the Monte Carlo rendering image. Denoising, while achieving a good denoising effect on low-frequency details, it can also significantly improve the retention of high-frequency details to obtain a more visually realistic rendering.

In order to achieve the above-mentioned purpose of the present invention, the following technical solutions are provided:

The first embodiment provides a method for constructing a Monte Carlo rendering graph denoising model based on a Generative Adversarial Network (GAN), which comprises the following steps:

Obtaining the Monte Carlo rendering image containing noise as the noise rendering image, obtaining the auxiliary features when generating the noise rendering image, and using the noise rendering image and the corresponding auxiliary features, and the target rendering image corresponding to the noise rendering image as a training sample;

Constructing a Generative Adversarial Network (GAN). The Generative Adversarial Network (GAN) includes a denoising network and a discriminant network. The denoising network is used to denoise the input noise rendering image and auxiliary features, and output the denoising rendering image. The discriminant network is used to classify the input denoising rendering image and the target rendering image corresponding to the noise rendering image, and output the classification result;

The training samples are used to tune the network parameters of the Generative Adversarial Network (GAN). After the tuning is completed, the denoising network determined by the network parameters is used as the Monte Carlo rendering image denoising model.

The second embodiment provides a Monte Carlo rendering map denoising model based on a Generative Adversarial Network (GAN), and the Monte Carlo rendering map denoising model is constructed by the construction method provided in the first embodiment.

Preferably, the Monte Carlo rendering image denoising model is the Monte Carlo rendering image denoising model $M_d$, which is the Monte Carlo rendering image $P_d$ obtained by using the diffuse path rendering process to generate the Monte Carlo rendering image $P_d$. The auxiliary features of and the target rendering corresponding to the Monte Carlo rendering $P_d$ are obtained as training samples.

The Monte Carlo rendering image denoising model is the Monte Carlo rendering image denoising model $M_s$, which is the Monte Carlo rendering image $P_s$ obtained by rendering using the specular path rendering process, and auxiliary features when generating the Monte Carlo rendering image $P_s$, And the target rendering image corresponding to the Monte Carlo rendering image $P_s$ is obtained as a training sample.

The third embodiment provides a Monte Carlo rendering image denoising method, which comprises the following steps:

According to the material difference at the intersection of the first ray and the object of the path tracing, the rendering process of the rendering engine is split into the diffuse path rendering process and the specular path rendering process;

Using the diffuse path rendering process and the specular path rendering process to perform rendering respectively to obtain the noisy Monte Carlo rendering image $P_d$ and Monte Carlo rendering image $P_s$, and generate the Monte Carlo rendering image $P_d$ and the Monte Carlo rendering image $P_s$ corresponding auxiliary feature;

Inputting the Monte Carlo rendering image $P_d$ and the corresponding auxiliary features into the Monte Carlo rendering image denoising model $M_d$ to obtain the denoising rendering image $P_d'$;

Inputting the Monte Carlo rendering image $P_s$ and the corresponding auxiliary features into the Monte Carlo rendering image denoising model $M_s$ to obtain the denoising rendering image $P_s'$;

The denoising rendering image $P_d'$ and the denoising rendering image $P_s'$ are merged to obtain the final denoising rendering image.

The fourth embodiment provides a denoising device for Monte Carlo rendering, comprising a computer memory, a computer processor, and a computer program stored in the computer memory and executable on the computer processor. The Monte Carlo rendering image denoising model Ms and the Monte Carlo rendering image denoising model Md are stored in the computer memory.

When the computer processor executes the computer program, the following steps are implemented:

According to the material difference at the intersection of the first ray and the object of the path tracing, the rendering process of the rendering engine is split into the diffuse path rendering process and the specular path rendering process.

Using the diffuse path rendering process and the specular path rendering process to perform rendering respectively to obtain the Monte Carlo rendering Pd and Monte Carlo rendering Ps of low sampling rate, and generate the Monte Carlo rendering Pd and Monte Carlo rendering Ps corresponding to auxiliary features;

Calling the Monte Carlo rendering image denoising model $M_d$ to denoise the Monte Carlo rendering image $P_d$ and the corresponding auxiliary features to obtain the denoising rendering image $P_d'$;

Calling the Monte Carlo rendering image denoising model $M_s$ to denoise the Monte Carlo rendering image $P_s$ and the corresponding auxiliary features to obtain the denoising rendering image $P_s'$;

The denoising rendering image $P_d'$ and the denoising rendering image $P_s'$ are merged to obtain the final denoising rendering image.

The beneficial effects of the present invention are as follows:

The Monte Carlo rendering image denoising model has stronger denoising capabilities, and the denoising rendering image obtained after denoising can bring better denoising effects in terms of human visual perception.

The denoising method and device for the Monte Carlo rendering map use the Monte Carlo rendering map denoising model, which can achieve the rendering effect that can be achieved by using a lower sampling rate to achieve a high sampling rate, and the time for denoising is only limited to one second, it is far less than the rendering time required for multi-sampling (on the order of hundreds to thousands of seconds), which greatly saves rendering time and computing costs, thereby reducing the use of servers and reducing the industry cost of the entire rendering service, and save resources.

BRIEF DESCRIPTION OF DRAWINGS

In order to explain the embodiments of the present invention or the technical solutions in the prior art more clearly, the following will briefly introduce the drawings that need to be used in the description of the embodiments or the prior art. Obviously, the drawings in the following description are only some implementation examples of the present invention. For the people who have ordinary skill in this field, other drawings can be obtained based on these drawings without creative work.

DETAILED DESCRIPTION OF THE EMBODIMENTS

In order to make the objects, technical solutions, and advantages of the present invention clearer, the following further describes the present invention in detail with reference to the accompanying drawings and embodiments. It should be understood that the specific embodiments described herein are only used to explain the present invention, and do not limit the protection scope of the present invention.

When the Monte Carlo rendering of the model is performed at a low sampling rate, the Monte Carlo rendering image obtained often has a lot of noise. In order to remove the noise in the Monte Carlo rendering image, the following implementation provides a Generative Adversarial Network (GAN) based on the Monte Carlo rendering image denoising model and the method for establishing the same, a denoising method using the Monte Carlo rendering image denoising model, and a denoising device calling the Monte Carlo rendering image denoising model.

Figure 1:
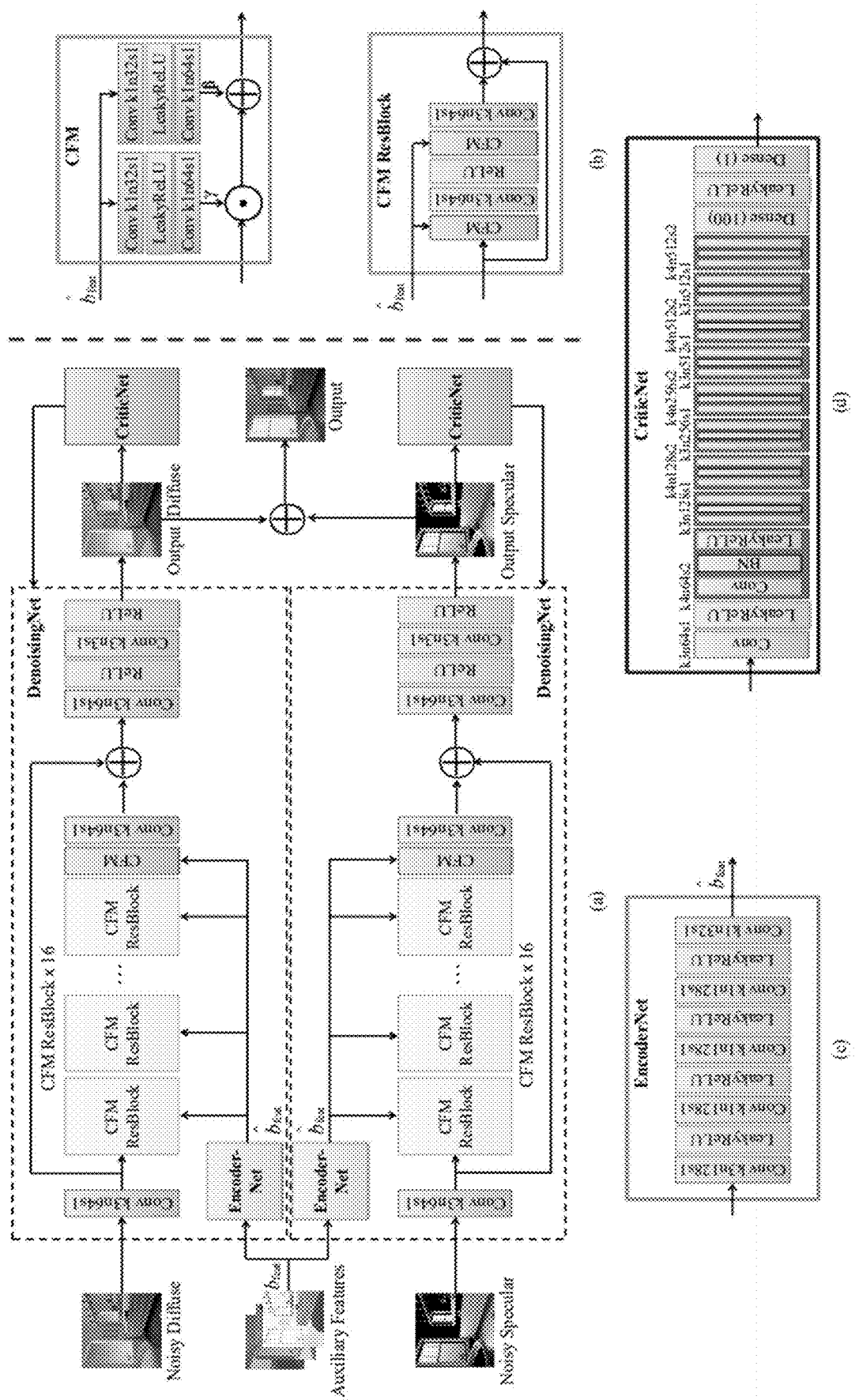
FIG. 1 is a schematic diagram of the structure of a Generative Adversarial Network (GAN)
Figure 2:
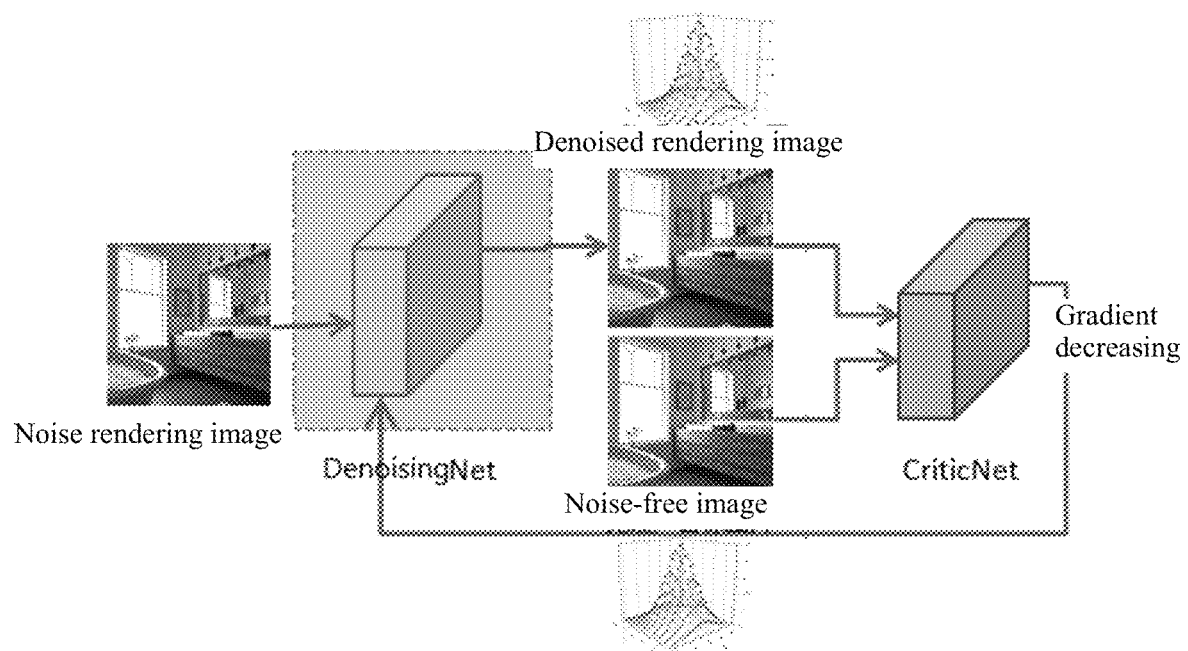
FIG. 2 is a schematic diagram of the training process of a Generative Adversarial Network (GAN)

An embodiment provides a method for establishing a Monte Carlo rendering image denoising model based on a Generative Adversarial Network (GAN), as shown in FIG. 1 and FIG. 2, which specifically includes the following processes:

Creating a Training Sample Set

First, using a low sampling rate to perform Monte Carlo rendering on the model to obtain a noisy Monte Carlo rendering image as a noise rendering image. Then, using a high sampling rate to perform Monte Carlo rendering on the same model to obtain a minimal noise Monte Carlo rendering image, and using the Monte Carlo rendering image with very little noise as the target rendering image. Of course, other methods can also be used to denoise the noise rendering image to obtain the target rendering image with the image quality meeting the requirements. The method of obtaining the target rendering image is not limited here.

The goal that the Monte Carlo rendering image denoising model constructed in this embodiment can achieve is to perform a denoising operation on the input noise rendering image, and output the denoising rendering image whose image quality reaches the target rendering image.

In order to improve the denoising ability of the Monte Carlo rendering image denoising model, the present invention also considers adding other auxiliary features as the input of the Monte Carlo rendering image denoising model, so that the Monte Carlo rendering image denoising model can be denoising. Comprehensively combining the noise rendering image features and auxiliary features, and extracting the feature points that can improve the image quality multiple times to form a denoising rendering map. Therefore, when using a low sampling rate to perform Monte Carlo rendering on the model to obtain a noisy Monte Carlo rendering image as a noise rendering image, the auxiliary features corresponding to the noise rendering image are extracted. These auxiliary features include but are not limited to Normal Buffer, Depth Buffer, Material Texture Albedo Buffer.

Therefore, the noise rendering image and the corresponding auxiliary features, and the target rendering image corresponding to the noise rendering image are used as a training sample to construct a training sample set.

Constructing a Generative Adversarial Network (GAN)

The Convolutional Neural Network (CNN) is simply used to denoise the noise rendering image, and the obtained denoising rendering image lacks realism in the details. In order to improve the retention of high-frequency details during denoising, this embodiment constructs Monte Carlo through adversarial learning Rendering image denoising model. Specifically, the constructed Generative Adversarial Network (GAN) includes the Denoising Net and the Critic Net. Among them, the Denoising Net is used to denoise the input noise rendering image and auxiliary features, and the output denoise Noise rendering map, the Critic Net is used to classify the input denoising rendering map and the target rendering map corresponding to the noise rendering map, and output the classification results.

Specifically, the denoising network comprises:
An auxiliary graph feature extraction sub-network, the auxiliary graph feature extraction sub-network is a Convolutional Neural Network (CNN) including at least one convolutional layer, and is used to fuse input auxiliary features and output auxiliary feature maps;
A rendering map feature extraction sub-network, the rendering map feature extraction sub-network is a Convolutional Neural Network (CNN) including at least one convolutional layer, used for extracting features of a noise rendering map, and outputting a noise feature map;
A feature fusion sub-network, the feature fusion sub-network is a neural network that uses residual thought and uses convolutional layers to fuse and extract auxiliary feature maps and noise feature maps.

For the auxiliary graph feature extraction sub-network Encoder Net, it can be a Convolutional Neural Network (CNN) connected in turn with at least two convolutional layers Conv and activation layer RelU. For example, the auxiliary feature fusion network Encoder Net can be as shown in FIG. 1 (c). The shown Convolutional Neural Network (CNN) specifically includes successively connected Convk3n128s1, Leaky RelU, Conv k1n128s1, Leaky RelU, Conv k1n128s1, Leaky RelU, Conv k1n128s1, Leaky RelU and Conv k1n32s1, where the convolutional kernel of Convk3n128s1 is 3*3. For the convolutional layer with 128 channels and 1 step size, the explanation of other convolutional layers is similar, so it won't be repeated them here.

Specifically, the feature fusion sub-network may comprise:
A feature fusion unit, which is used to combine the auxiliary feature map and the noise feature map to output the modulation feature map, specifically including multiple auxiliary feature modulation modules CFM ResBlock, auxiliary feature modulation section CFM and convolutional layer connected in sequence. Among them, the input of the auxiliary feature modulation module CFM Block and the auxiliary feature modulation section CFM are the output of the auxiliary feature map and the previous layer, and the input of the first auxiliary feature modulation module CFM ResBlock is the noise feature map and the auxiliary feature map. The input of convolutional layer is the output of the auxiliary feature modulation section CFM, and the output is the modulation characteristic map;
An output unit, which is used to perform feature fusion on the noise feature map output by the feature extraction unit and the modulation feature map output by the modulation unit, that is, the input is the feature map after the noise feature map and the modulation feature map are superimposed, and the output is the denoising rendering image.

Specifically, the auxiliary feature modulation module CFM ResBlock comprise an auxiliary feature modulation section CFM, a convolutional layer, an activation layer, and a superposition operation. Among them, the auxiliary feature modulation section CFM is used to modulate the auxiliary feature and the last output feature, that is, the auxiliary feature modulation section CFM. The input of the feature modulation section CFM includes the auxiliary feature map and the output feature of the previous layer. The superimposition operation is used to superimpose the input of the auxiliary feature modulation module CFM ResBlock and the output of the final convolutional layer.

For example, as shown in FIG. 1(b), the auxiliary feature modulation module CFM ResBlock includes the auxiliary feature modulation section CFM, Convk3n64s1, ReLU, the auxiliary feature modulation section CFM, Conv k3n64s1, and the superposition operation ⊕ which are connected in sequence. The input of the auxiliary feature modulation section CFM includes the auxiliary feature map and the output feature of the previous layer. The superimposition operation is used to superimpose the input of the auxiliary feature modulation module CFM ResBlock and the output of Conv k3n64s1.

Among them, the auxiliary feature modulation section CFM includes a convolution layer, a dot multiplication operation, and a superimpostion operation. The input of the convolution layer is the auxiliary feature map, and the dot multiplication operation is used to dot multiplicate the output of the convolution layer and the output of the previous layer. The superposition operation is used to superimpose the output of the convolutional layer and the dot multiplication operation, and output the feature map.

For example, as shown in FIG. 1(b), the auxiliary feature modulation section CFM includes Conv k1n32s1, Leaky ReLU, Conv k1n64s1, dot multiplication operation ⊙ and superposition operation ⊕, where Conv k1n32s1, Leaky ReLU, and Conv k1n64s1 are connected in sequence. The input of Conv k1n32s1 is the auxiliary feature map, the dot multiplication operation ⊙ refers to the dot multiplication operation of the output of the previous layer and the output $\gamma$ of Conv k1n64s1. The superposition operation ⊕ refers to the result of the dot multiplication operation and the output $\beta$ of Conv k1n64s1 Overlay.

Specifically, the fusion unit includes a convolutional layer and an activation layer, and is used to perform feature fusion on the noise feature map output by the feature extraction unit and the modulation feature map output by the modulation unit, and output a denoising feature map. For example, as shown in FIG. 1(a), the fusion unit includes Convk3n64s1, ReLU, Convk3n3s1, and ReLU connected in sequence.

Critic Net is a network composed of convolutional layer, BN (Batch Normalization), activation layer and fully connected layer. For example, as shown in FIG. 1(d), the discrimination network Critic Net includes successively connected Conv, Leaky ReLU, multiple consecutive extraction units, fully connected layer Dense (100), Leaky ReLU and fully connected layer Dense (1), wherein the extraction unit includes consecutive Conv, BN, and Leaky ReLU. The 100 of the fully connected layer Dense (100) indicates that the output dimension is 100.

Training of Generative Adversarial Network (GAN)

After constructing the Generative Adversarial Network (GAN), the training sample set is used to conduct confrontation training on the Generative Adversarial Network (GAN), and optimize the network parameters of the Generative Adversarial Network (GAN). The role of Denoising Net is to denoise the noise rendering image and generate the denoising rendering image, the purpose of which is to make Critic Net unable to distinguish the denoising rendering image and the target rendering image; while the role of Critic Net is to distinguish as much as possible the visual quality of the denoising rendering image and the target rendering image. Therefore, during the training, the difference between the predicted output of Critic Net and the actual label is used to pass back and update the parameters in the Generative Adversarial Network (GAN) to realize the confrontation training of the generation confrontation network. The whole training is based on the confrontation process so that DenoisingNet and CriticNet can be improved at the same time.

When the parameter tuning is over, extract the Denoising Net determined by the parameters as the Monte Carlo rendering denoising model.

The Monte Carlo rendering image denoising model can achieve the denoising of noisy Monte Carlo rendering images. While achieving a good denoising effect on low-frequency details, it can also significantly improve the retention of high-frequency details to gain more visually-realistic rendering.

Based on the construction of the above-mentioned Monte Carlo rendering image denoising model, the Generative Adversarial Network (GAN) constructed above can also be trained by changing the training samples to obtain a Monte Carlo rendering image denoising model capable of processing other input images.

As is known, Monte Carlo rendering is an improvement of traditional reverse ray tracing, which is still mainly based on the principle of ray tracing. Therefore, when rendering, according to the material difference at the intersection of the first ray and object of path tracing, the rendering process of the rendering engine can be split into the diffuse path rendering process and the specular path rendering process. Separately render using the diffuse path rendering process and the specular path the rendering process to obtain both the Monte Carlo rendering image $P_d$ and the Monte Carlo rendering image $P_s$.

On this basis, the Monte Carlo rendering image denoising model $M_d$ for denoising the Monte Carlo rendering image $P_d$ and the Monte Carlo rendering image denoising model $M_s$ for denoising the Monte Carlo rendering image $P_s$ can be obtained.

Specifically, using the Monte Carlo rendering image $P_d$ rendered by the diffuse path rendering process as the noise rendering image $P_d$ (that is, Noisy Diffuse). Using the noise rendering image $P_d$, the auxiliary feature when generating the noise rendering image $P_d$, and the target rendering corresponding to the noise rendering map $P_d$ as the training sample to conduct confrontation training on the above-mentioned Generative Adversarial Network (GAN). After confrontation training is completed, extract the denoising network Denoising Net and the auxiliary feature fusion network Encoder Net as the Monte Carlo rendering map denoising model $M_d$.

Using the Monte Carlo rendering image $P_s$ rendered by the specular path rendering process as the noise rendering image $P_s$ (that is, Noisy Specular). Using the noise rendering image $P_s$, the auxiliary feature when generating the noise rendering image $P_s$, and the target rendering corresponding to the noise rendering map $P_s$ as the training sample to conduct confrontation training on the above-mentioned Generative Adversarial Network (GAN). After confrontation training is completed, extract the denoising network Denoising Net and the auxiliary feature fusion network Encoder Net as the Monte Carlo rendering map denoising model $M_s$.

Figure 3:
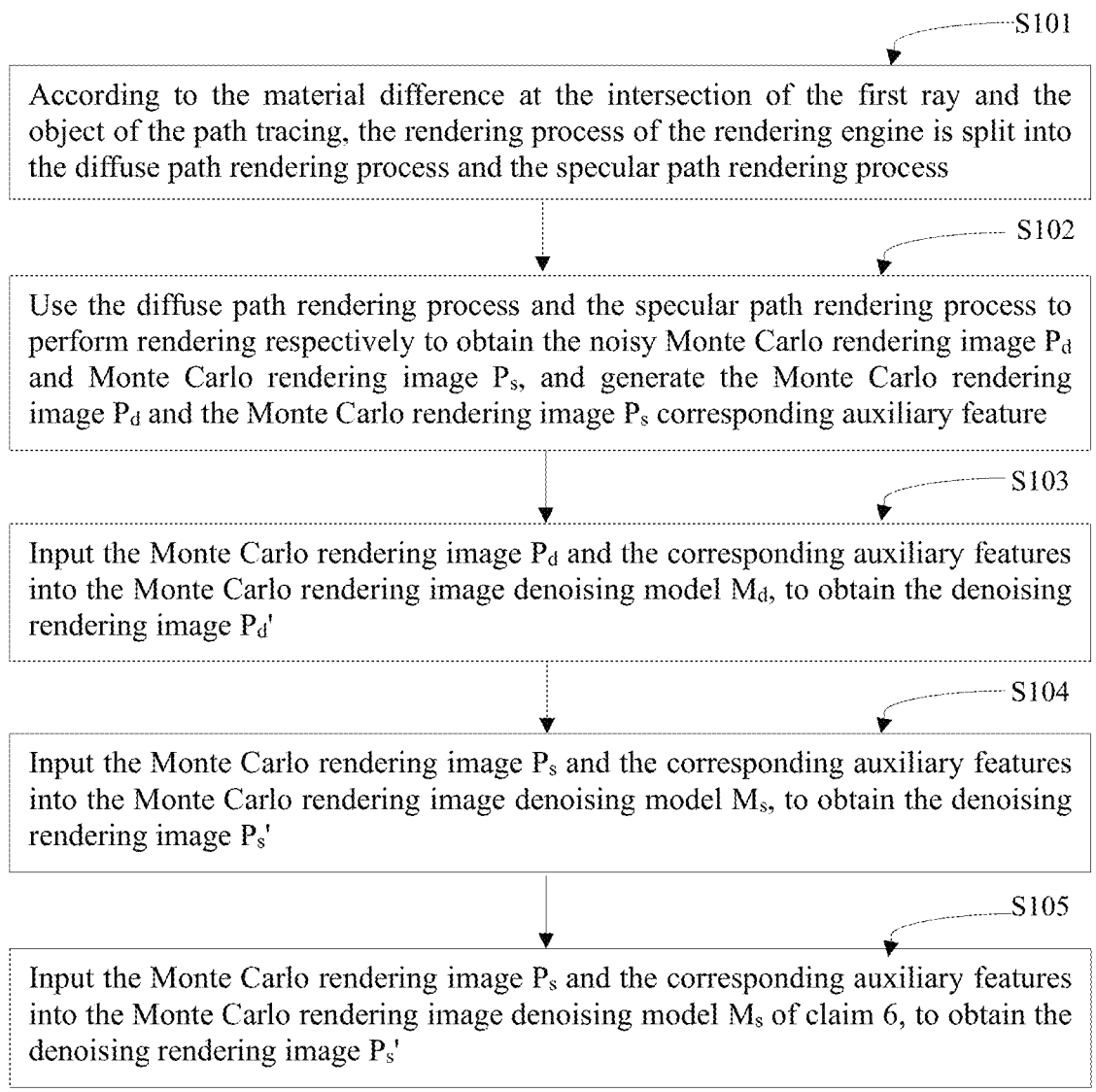
FIG. 3 is a schematic flow chart of a denoising method for a Monte Carlo rendering image.

Another embodiment provides a Monte Carlo rendering image denoising method, as shown in FIG. 3, including the following steps:

S101: according to the material difference at the intersection point of the first ray and object of the path tracing, the rendering process of the rendering engine is split into a diffuse path rendering process and a specular path rendering process;

S102: respectively using the diffuse path rendering process and the specular path rendering process for rendering to obtain the Monte Carlo rendering image $P_d$ and the Monte Carlo rendering image $P_s$, and generate the auxiliary features of Monte Carlo rendering image $P_d$ and the Monte Carlo rendering image $P_s$ correspondingly;

S103: inputting the Monte Carlo rendering image $P_d$ and the corresponding auxiliary features into the above-mentioned Monte Carlo rendering image denoising model $M_d$ to obtain the denoising rendering image $P_d'$;

S104: inputting the Monte Carlo rendering image $P_s$ and the corresponding auxiliary features into the above-mentioned Monte Carlo rendering image denoising model $M_s$ to obtain the denoising rendering image $P_s'$;

S105: the denoising rendering image $P_d'$ and the denoising rendering image $P_s'$ are merged to obtain a final denoising rendering image.

In the denoising method, the Auxiliary Feature corresponding to the Monte Carlo rendering image $P_d$ and the Monte Carlo rendering image $P_s$ includes, but is not limited to, Normal Buffer, Depth Buffer, and the material texture map Albedo Buffer.

The Monte Carlo rendering image denoising model $M_d$ and the Monte Carlo rendering image denoising model $M_s$ are constructed and obtained according to the above construction method, and will not be repeated here.

This denoising method uses the Monte Carlo rendering image denoising models $M_d$ and $M_s$, which can achieve a rendering effect that can only be achieved by using a lower sampling rate to achieve a higher sampling rate. At the same time, the denoising time is only on the order of one second, which is much less than the rendering time required for multi-sampling (on the order of hundreds to thousands of seconds), which greatly saves rendering time and computing costs, thereby reducing the use of servers and the industry cost of the entire rendering service, and saving resources.

Another embodiment provides a denoising device for Monte Carlo rendering, including a computer memory, a computer processor, and a computer program stored in the computer memory and executable on the computer processor. The above-mentioned Monte Carlo rendering image denoising model $M_s$ and the Monte Carlo rendering image denoising model $M_d$ are stored in the computer memory;

When the computer processor executes the computer program, the following steps are implemented:

According to the material difference at the intersection of the first ray and the object of the path tracing, the rendering process of the rendering engine is split into the diffuse path rendering process and the specular path rendering process;

Using the diffuse path rendering process and the specular path rendering process to perform rendering respectively to obtain the Monte Carlo rendering $P_d$ and Monte Carlo rendering $P_s$ of low sampling rate, and generate the Auxiliary Features corresponding to Monte Carlo rendering $P_d$ and Monte Carlo rendering $P_s$;

Calling the Monte Carlo rendering image denoising model $M_d$ to denoise the Monte Carlo rendering image $P_d$ and the corresponding auxiliary features to obtain the denoising rendering image $P_d'$;

Calling the Monte Carlo rendering image denoising model $M_s$ to denoise the Monte Carlo rendering image $P_s$ and the corresponding auxiliary features to obtain the denoising rendering image $P_s'$;

The denoising rendering image $P_d'$ and the denoising rendering image $P_s'$ are merged to obtain the final denoising rendering image.

This denoising method uses the Monte Carlo rendering image denoising models $M_d$ and $M_s$, which can achieve a rendering effect that can only be achieved by using a lower sampling rate to achieve a higher sampling rate. At the same time, the denoising time is only on the order of one second, which is much less than the rendering time required for multi-sampling (on the order of hundreds to thousands of seconds), which greatly saves rendering time and computing costs, thereby reducing the use of servers and the industry cost of the entire rendering service, and saving resources.

The specific implementations described above describe the technical solutions and benefits of the present invention in detail. It should be understood that the above descriptions are only the most preferred embodiments of the present invention and are not intended to limit the present invention. Any modifications, complements and equivalent replacements made within the scope shall be included in the protection scope of the present invention.

The invention claimed is:

1. A method for constructing a denoising model of Monte Carlo rendering based on a Generative Adversarial Network (GAN), comprising the following steps:

obtaining Monte Carlo rendering image containing noise as a noise rendering image, obtaining auxiliary features when generating the noise rendering image, and using the noise rendering image and the corresponding auxiliary features, and a target rendering image corresponding to the noise rendering image as a training sample;

constructing a Generative Adversarial Network (GAN), wherein the Generative Adversarial Network (GAN) comprises:

a denoising network and a discriminant network, wherein the denoising network is used to denoise the input noise rendering image and auxiliary features, and output the denoising rendering image, and the discriminant network is used to classify the input denoising rendering image and the target rendering image corresponding to the noise rendering image, and output the classification result;

the training samples are used to tune the network parameters of the Generative Adversarial Network (GAN); after the tuning is completed, the denoising network determined by the network parameters is used as the Monte Carlo rendering image denoising model;

wherein the denoising network comprises:

an auxiliary graph feature extraction sub-network, wherein the auxiliary graph feature extraction sub-network is a Convolutional Neural Network (CNN) comprising at least one convolutional layer, and is used to fuse input auxiliary features and output auxiliary feature maps;

a rendering map feature extraction sub-network, wherein the rendering map feature extraction sub-network is a Convolutional Neural Network (CNN) including at least one convolutional layer, used for extracting features of a noise rendering map, and outputting a noise feature map;

a feature fusion sub-network, wherein the feature fusion sub-network is a neural network that uses residual thought and uses convolutional layers to fuse and extract auxiliary feature maps and noise feature maps.

2. The method for constructing a Monte Carlo rendering graph denoising model based on a Generative Adversarial Network (GAN) according to claim 1, wherein the feature fusion sub-network comprises:

a feature fusion unit, which is used to combine the auxiliary feature map and the noise feature map to output the modulation feature map, specifically comprising multiple auxiliary feature modulation modules: CFM ResBlock, auxiliary feature modulation section CFM and convolutional layer connected in sequence; wherein, the input of the auxiliary feature modulation module CFM Block and the auxiliary feature modulation section CFM are the output of the auxiliary feature map and the previous layer, and the input of the first auxiliary feature modulation module CFM ResBlock is the noise feature map and the auxiliary feature map, the input of convolutional layer is the output of the auxiliary feature modulation section CFM, and the output is the modulation characteristic map;

an output unit is used to perform feature fusion on the noise feature map output by the feature extraction unit and the modulation feature map output by the modulation unit, that is, the input is the feature map after the noise feature map and the modulation feature map are superimposed, and the output is the denoising rendering picture.

3. The method for constructing a Monte Carlo rendering graph denoising model based on a Generative Adversarial Network (GAN) according to claim 1, wherein the discriminant network is composed of a convolutional layer, a Batch Normalization (BN), an activation layer, and a fully connected layer.

4. A Monte Carlo rendering map denoising model based on a Generative Adversarial Network (GAN), wherein the Monte Carlo rendering map denoising model is constructed and obtained by the construction method of claim 1; and wherein:

the Monte Carlo rendering image denoising model is the Monte Carlo rendering image denoising model $M_d$, which is the Monte Carlo rendering image $P_d$ obtained by using the diffuse path rendering process, and auxiliary features when generating the Monte Carlo rendering image $P_d$, and the target rendering image corresponding to the Monte Carlo rendering image $P_d$ is trained as a training sample;

the Monte Carlo rendering image denoising model is the Monte Carlo rendering image denoising model $M_s$, which is the Monte Carlo rendering image Ps obtained by rendering using the specular path rendering process, and auxiliary features when generating the Monte Carlo rendering image $P_s$, and the target rendering image corresponding to the Monte Carlo rendering image $P_s$ is obtained as a training sample.

5. A denoising method for Monte Carlo rendering image, comprising the following steps:

according to the material difference at the intersection of the first ray and the object of the path tracing, splitting the rendering process of the rendering engine into a diffuse path rendering process and a specular path rendering process;

using the diffuse path rendering process and the specular path rendering process to perform rendering respectively to obtain the noisy Monte Carlo rendering image $P_d$ and Monte Carlo rendering image $P_s$, and generating the Monte Carlo rendering image $P_d$ and the Monte Carlo rendering image $P_s$ corresponding auxiliary feature;

inputting the Monte Carlo rendering image $P_d$ and the corresponding auxiliary features into the Monte Carlo rendering image denoising model $M_d$ of claim 4, to obtain the denoising rendering image $P_d'$;

inputting the Monte Carlo rendering image $P_s$ and the corresponding auxiliary features into the Monte Carlo rendering image denoising model $M_s$ of claim 4, to obtain the denoising rendering image $P_s'$;

merging the denoising rendering image $P_d'$ and the denoising rendering image $P_s'$ to obtain the final denoising rendering image.

6. A denoising device for Monte Carlo rendering image, comprising a computer memory, a computer processor, and a computer program stored in the computer memory and executable on the computer processor, characterized in that:

the computer memory stores the Monte Carlo rendering image denoising model $M_s$ and the Monte Carlo rendering image denoising model $M_d$ according to claim 4;

when the computer processor executes the computer program, the following steps are implemented:

according to the material difference at the intersection of the first ray and the object of the path tracing, splitting the rendering process of the rendering engine into a diffuse path rendering process and a specular path rendering process;

using the diffuse path rendering process and the specular path rendering process to perform rendering respectively to obtain the Monte Carlo rendering $P_d$ and Monte Carlo rendering $P_s$ of low sampling rate, and generate the Monte Carlo rendering $P_d$ and Monte Carlo rendering $P_s$ corresponding to Auxiliary features;

calling the Monte Carlo rendering image denoising model $M_d$ to denoise the Monte Carlo rendering image $P_d$ and the corresponding auxiliary features to obtain the denoising rendering image $P_d'$;

calling the Monte Carlo rendering image denoising model $M_s$ to denoise the Monte Carlo rendering image $P_s$ and the corresponding auxiliary features to obtain the denoising rendering image $P_s'$;

merging the denoising rendering image $P_d'$ and the denoising rendering image $P_s'$ to obtain the final denoising rendering image.

\* \* \* \* \*